(No Model.) 3 Sheets—Sheet 1.

C. T. PRATT.
MACHINE FOR FORMING BUSHING FERRULES.

No. 590,275. Patented Sept. 21, 1897.

WITNESSES.
Rich. A. George
L. H. Colegrove

INVENTOR
CHARLES T. PRATT
By Kirby, Robinson & Love
ATTORNEY's.

(No Model.) 3 Sheets—Sheet 2.

C. T. PRATT.
MACHINE FOR FORMING BUSHING FERRULES.

No. 590,275. Patented Sept. 21, 1897.

WITNESSES.
Rich. A. George
L. H. Colgrove

INVENTOR
CHARLES T. PRATT.
By Risley, Robinson & Love
ATTORNEY's.

(No Model.) 3 Sheets—Sheet 3.
C. T. PRATT.
MACHINE FOR FORMING BUSHING FERRULES.
No. 590,275. Patented Sept. 21, 1897.
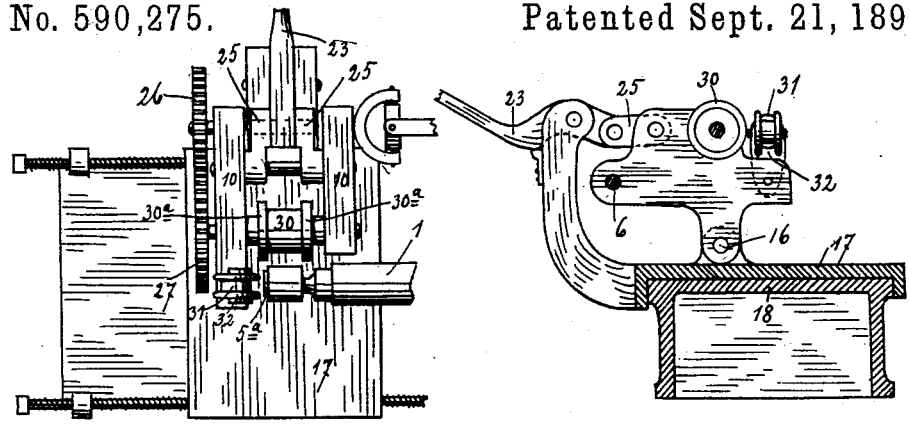
Fig. 7. Fig. 8.
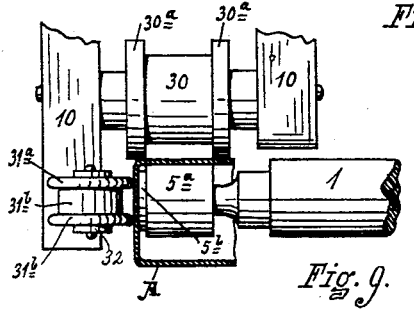
Fig. 9.
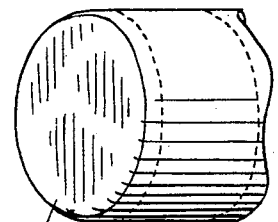
Fig. 10.
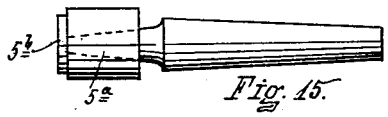
Fig. 15.
 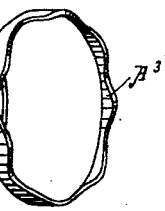 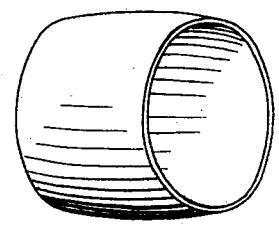
Fig. 11. Fig. 12. Fig. 13. Fig. 14.
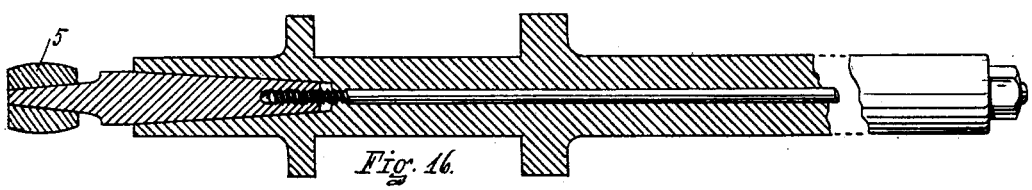
Fig. 16.
WITNESSES
Rich. A. George
L. H. Colegrove
INVENTOR
CHARLES T. PRATT.
By Riely, Robinson & Love
ATTORNEYS

UNITED STATES PATENT OFFICE.

CHARLES T. PRATT, OF CLAYVILLE, NEW YORK.

MACHINE FOR FORMING BUSHING-FERRULES.

SPECIFICATION forming part of Letters Patent No. 590,275, dated September 21, 1897.

Application filed February 1, 1896. Serial No. 577,668. (No model.)

*To all whom it may concern:*

Be it known that I, CHARLES T. PRATT, of Clayville, in the county of Oneida and State of New York, have invented certain new and useful Improvements in Machines for Forming Bushing-Ferrules; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

My invention relates to an improvement in machines for making bushing-ferrules.

Figure 1:
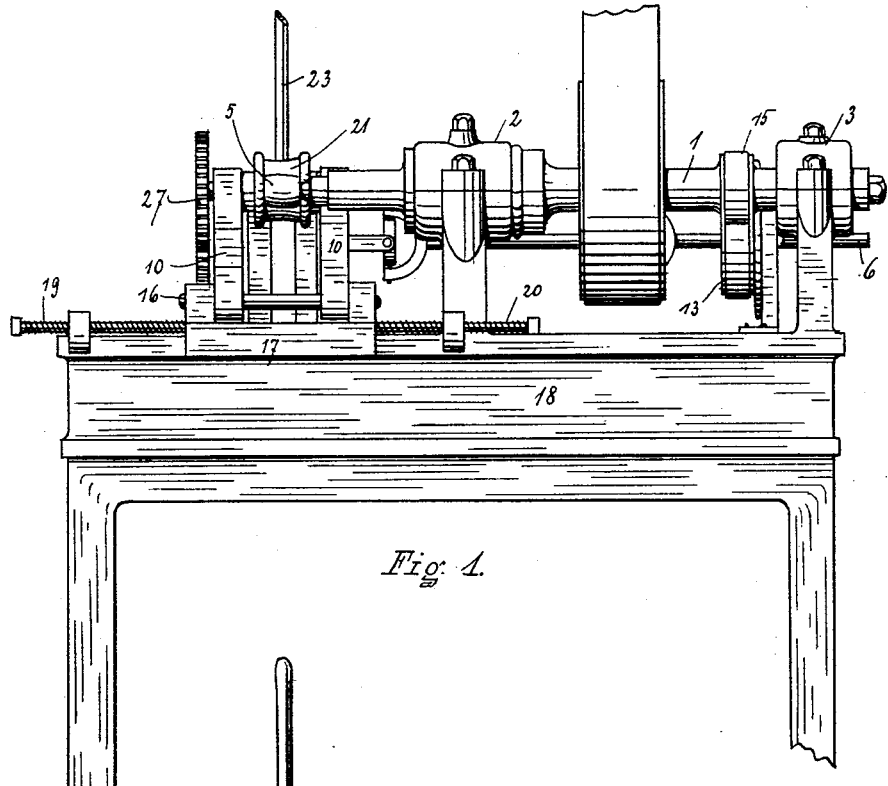
Figure 2:
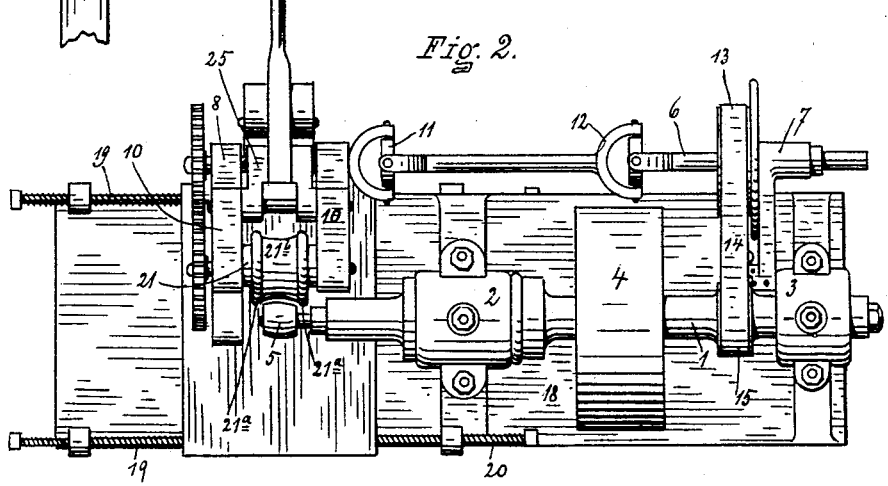
Figure 4:
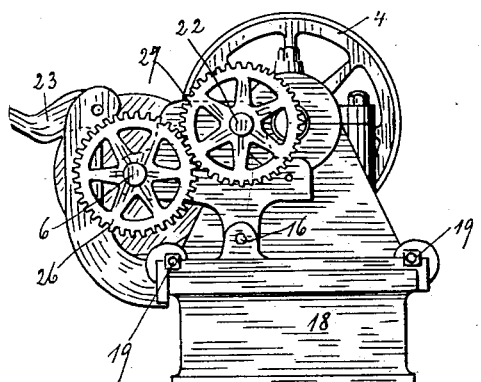
Figure 4:
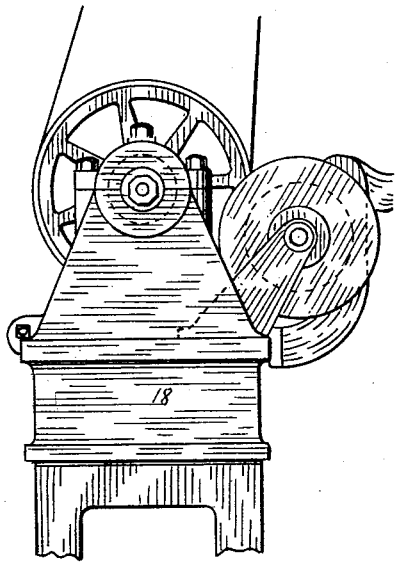
Figure 3:
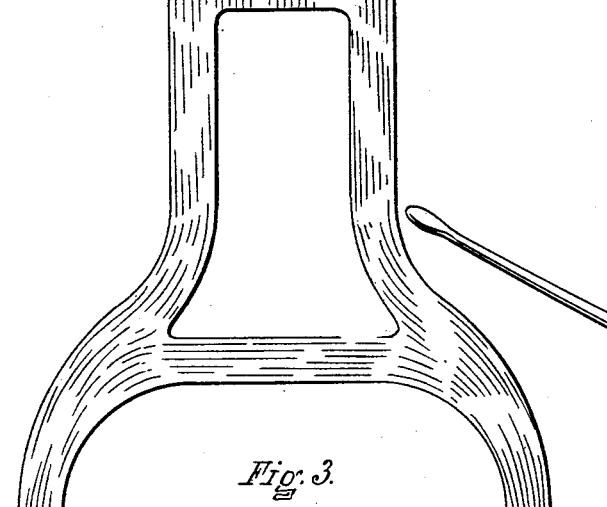
Figure 5:
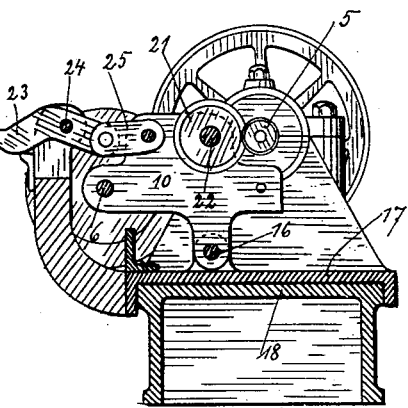
Figure 6:
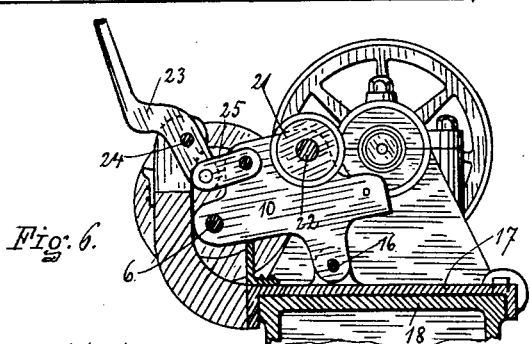

In the drawings, Figure 1 shows a front view of the machine arranged for rolling the ferrule. Fig. 2 shows a plan view of the same. Fig. 3 shows a left-hand end view, as shown in Figs. 1 and 2. Fig. 4 shows the right-hand end view, as shown in Figs. 1 and 2. Fig. 5 shows details of the operating parts in the position of operation. Fig. 6 shows the same out of operation. Fig. 7 shows a plan view of the parts shown in Fig. 6 with added details and arranged for performing the cutting operation. Fig. 8 is an end view of the parts shown in Fig. 7. Fig. 9 shows in enlarged detail the cutting operation. Fig. 10 shows the drawn-metal blank. Figs. 11, 12, and 13 show the blank after being cut. Fig. 14 shows the bushing-ferrule complete. Fig. 15 shows the mandrel-head for the cutting operation. Fig. 16 shows the mandrel-head for the rolling operation.

Referring to the reference letters and figures in a more particular description of the device, 1 indicates a mandrel mounted in bearings 2 and 3 and provided with a pulley 4, by means of which it is driven.

The mandrel is provided with a mandrel-head 5, as shown in Figs. 1 and 2, which is of a barrel-shaped form. A back shaft 6 is mounted in a fixed bearing 7 on the frame of the machine at one end and in bearings 8 and 9 in the rocking carriage or tool-holder 10 at the other end and is provided with two universal-joint couplings 11 and 12.

On the stationary section of the back shaft 6 is provided a band-pulley 13, which is driven by a band or belt 14 from the small band-pulley 15 on the mandrel 1. The rocking carriage or tool-holder 10 is pivoted at 16 to the base 17, which is adjustable along the machine or lathe bed 18 by means of the adjusting-screws 19 19 20 20. The roller-tool 21 of Figs. 2, 5, and 6 is mounted on a short shaft or journal 22 in the rocking tool-holder 10 and is located in a position so that the two flanges $21^a$ thereof will just pass the ends of the mandrel-head 5 as the tool is forced against the head. The body portion $21^b$ of the roller-tool is concaved to substantially conform in curvature to the convex surface of the swell in the mandrel-head. For operating the roller toward and from the mandrel-head 5 there is provided a lever-handle 23, pivoted at 24 in an arm from the movable base 17 and connected at its short end by links 25 with the rocking tool-holder 10, forming, in connection with the links, a toggle-joint.

The roller or tool is driven positively from the back shaft 6 by means of the gears 26 and 27, located on the ends of the shaft 6, and the shaft or journal of the roller-tool, respectively. The swinging movement of the tool-holder 10 is accommodated by the universal joints 11 and 12 in the back shaft. When arranged for the cutting operation, there is substituted for the mandrel-head 5 a mandrel-head $5^a$, and in place of the roller 21 the rolling tool 30, provided with square sharp-edged flanges $30^a$, adapted to shear by the ends of the cylindrical body of the mandrel-head $5^a$. The mandrel-head $5^a$ is also provided with a raised central portion $5^b$ on the projecting end for purposes hereinafter pointed out. In the cutting operation there is also applied to the tool-holder or carriage 10 a roller 31, carried by an upright piece 32, to bring the roller opposite the end of the mandrel-head when the tool is in operation.

The blanks shown in Fig. 10 and indicated by A are formed from a sheet-metal disk by punching and drawing dies, either hot or cold, as desired, leaving the blank as shown, in which form it is ready to be operated upon by this machine.

The mandrel-head cutter $5^a$ being fixed in the machine and the rolling cutter 30 also applied with the presser-roller 31, the blank A is placed on the mandrel and the attendant moves up the tool by operating the lever-handle 23 from the position shown in Fig. 6 toward that shown in Fig. 5. As the tool is moved up the presser-roller 31 engages against the head of the blank A and presses it firmly against the end of the mandrel-head 5ª, and particularly the portion 5ᵇ thereof.

It may be noted that the mandrel-head is of considerable less diameter than the cylindrical blank A on which it operates, as may readily be seen from Fig. 9. In the latter part of the operation the flanges 30ª 30ª of the cutter-roller shear by the ends of the mandrel-head 5ª and simultaneously cut off the two ends of the blank, it being understood, of course, that the mandrel-head and the roller-tool are both in rotation during the time that the machine is in operation. The smaller diameter of the portion 5ᵇ of the mandrel-head 5ª allows the flange 30ª of the cutting-roller to operate while the presser-roller 31 holds the blank in position. When the cutting has been effected, the tool is withdrawn and the attendant removes the cylindrical body portion A', together with the waste pieces A² and A³, and substitutes another blank A, when the operation is repeated. In order to put the swell in the bushing-ferrule, as shown in Fig. 14, the mandrel-head 5ª is removed and the one of the form shown in Figs. 1, 2, and 16 is substituted, and the roller 21 is substituted for the cutting-roller 30, and the presser-roller 31 is removed. The attendant then places the cylindrical blank A' on the mandrel-head and by means of the lever forces the tool firmly against the mandrel-head 5, with the piece A' thereon, and it is rolled from the form shown in Fig. 12 to the form shown in Fig. 14. In this operation the flanges of the roller serve to retain the piece being operated in a proper position on the head, it of course being understood that the mandrel-head is of smaller diameter than the piece being operated upon, in about the same proportion as is shown in Fig. 9 with reference to the cutting mandrel-head. The general diameter of the piece is not reduced in this operation. When the piece has been rolled into form, the roller is withdrawn and the attendant removes a piece and substitutes a new one, and the operation is repeated.

The roller 31 consists of two independent disks 31ª, separated by a body portion 31ᵇ of smaller diameter, so that as the blank revolves while being held by the presser-roller one disk will run in one direction and one in the other, reducing the amount of friction to the minimum. It is quite evident, however, that the presser-roller might be dispensed with, or rather some other pressing device substituted for the roller or a roller of the particular construction described. In changing the mandrel-heads or substituting new ones in the place of worn ones the bed 17, which carries the operating parts, may be adjusted to accommodate slight variations, and it may also be adjusted to accommodate tools for operating on various sizes and lengths of the ferruled bushings. The back shaft 6 is arranged to slide through the bearing 7 and the pulley 13 in accommodating the adjustment of the parts 17.

What I claim as new, and desire to secure by Letters Patent, is—

1. The combination of a mandrel-head, a rolling flanged cutter and an end presser adapted to operate against the end of the head, substantially as set forth.

2. The combination in a ferrule-machine of a rotary mandrel-head, driving mechanism a doubly-flanged roller-cutter, a cutter-driving mechanism and a movable carriage supporting the roller-cutter, substantially as set forth.

3. The combination in a ferrule-forming machine of a positive mandrel-head-driving mechanism, a rotary roller, roller-driving mechanism, a movable carriage carrying the roller and mechanism for operating the carriage to move the roller to and from the mandrel-head, substantially as set forth.

4. In a ferrule-forming machine the combination of a mandrel-head, mandrel-head-driving mechanism, a roller, a rocking tool-carriage carrying the roller-driving mechanism and a toggle-joint and lever for operating the tool-carriage, substantially as set forth.

5. In a ferrule-forming machine the combination of a rotary mandrel-head, a flanged roller adapted to operate on the head, a movable carriage supporting the roller, and an end presser mounted on the carriage, substantially as set forth.

In witness whereof I have affixed my signature in presence of two witnesses.

CHARLES T. PRATT.

Witnesses:
MYRON BUCHANAN,
CORREL HUMPHREY.